United States Patent
Ihara et al.

(10) Patent No.: US 7,953,454 B2
(45) Date of Patent: May 31, 2011

(54) WIRELESS HANDS-FREE SYSTEM WITH SILENT USER SIGNALING

(75) Inventors: Katsumi Ihara, London (GB); Daniel Paul Homiller, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 370 days.

(21) Appl. No.: 10/249,195

(22) Filed: Mar. 21, 2003

(65) Prior Publication Data

US 2004/0185915 A1 Sep. 23, 2004

(51) Int. Cl.
*H04M 1/00* (2006.01)

(52) U.S. Cl. .................. 455/569.1; 455/572; 455/456.4; 455/567; 455/41.2

(58) Field of Classification Search ............... 455/569.1, 455/575.2, 575.3, 456.4, 567, 41.2, 572
See application file for complete search history.

(56) References Cited

U.S. PATENT DOCUMENTS

| | | | | |
|---|---|---|---|---|
| 5,359,647 A * | 10/1994 | Regen et al. | ................... | 455/566 |
| 6,212,409 B1 * | 4/2001 | Matsuo et al. | ................ | 455/566 |
| 6,363,139 B1 * | 3/2002 | Zurek et al. | ................... | 379/56.1 |
| 6,374,126 B1 * | 4/2002 | MacDonald et al. | ...... | 455/569.1 |
| 6,560,468 B1 * | 5/2003 | Boesen | ....................... | 455/569.1 |
| 6,714,233 B2 * | 3/2004 | Chihara et al. | ............. | 348/14.02 |
| 6,725,065 B2 * | 4/2004 | Min | ............................. | 455/567 |
| 6,970,724 B2 * | 11/2005 | Leung | ........................... | 455/567 |
| 7,088,234 B2 * | 8/2006 | Naito et al. | .............. | 340/539.11 |
| 2002/0042281 A1 * | 4/2002 | Tsukamoto | .................... | 455/462 |
| 2002/0067825 A1 * | 6/2002 | Baranowski et al. | ......... | 379/430 |
| 2003/0022690 A1 * | 1/2003 | Beyda et al. | .................. | 455/556 |
| 2004/0100389 A1 * | 5/2004 | Naito et al. | ................ | 340/691.6 |
| 2004/0204168 A1 * | 10/2004 | Laurila | ...................... | 455/569.1 |

FOREIGN PATENT DOCUMENTS

| | | |
|---|---|---|
| CN | 1209032 A | 2/1999 |
| CN | 2422781 Y | 3/2001 |
| DE | 198 45 808 A1 | 4/2000 |
| EP | 0880256 A2 | 11/1998 |
| EP | 1005241 A1 | 5/2000 |
| FR | 2779598 | 12/1999 |
| JP | 02000349868 A * | 12/2000 |
| JP | 2003018251 A | 1/2003 |
| WO | WO 03/055183 | 7/2003 |

OTHER PUBLICATIONS

JP09149460A Kyocera Corp. Jun. 6, 1997, Vibrating type calling device of portable communication terminals.*

(Continued)

*Primary Examiner* — Nghi H Ly
(74) *Attorney, Agent, or Firm* — R. Brian Drozd; Moore & Van Allen

(57) ABSTRACT

Wireless hands-free system with silent user signaling. Silent alerting capability is provided for any hands-free device that relies on a short-range, wireless connection to interface to a terminal. The silent alerting action can be provided by any non-audible signaling mechanism, for example a vibrator or a light. A hands-free device establishes the short-range wireless connection with the communication terminal in question. When an alert message, such as for an incoming call, is received over the short-range wireless connection, the silent alerting action is produced in response to the alert message. The invention can find use in any wireless hands-free device, for example, a "Bluetooth" headset.

29 Claims, 7 Drawing Sheets

OTHER PUBLICATIONS

"Specification of the Bluetooth System; Profiles, version 1.1; Part K:6 : Headset Profile", Specification of the Bluetooth System, (Feb. 22, 2001) pp. 209-216.
International Search Report, PCT/IB2004/000037, May 28, 2004, Sony Ericsson Mobile Communications AB.
Written Opinion, PCT/IB2004/000037, May 28, 2004, Sony Ericsson Mobile Communications AB.
Product Manual, *BT200 Freespeak*, Jabra Corp., 2002.
Sony Ericsson Mobile Communications AB, First Office Action, issued in corresponding Chinese Patent Application No. 200480002327.4, Apr. 11, 2008.
Sony Ericsson Mobile Communicaitons AB, Official Office Action, issued in corresponding Japanese Patent Application No. 2006-506253, Sep. 29, 2008.
State Intellectual Property Office, P.R. China. Second Office Action. Mar. 29, 2010. 8 pgs.

\* cited by examiner

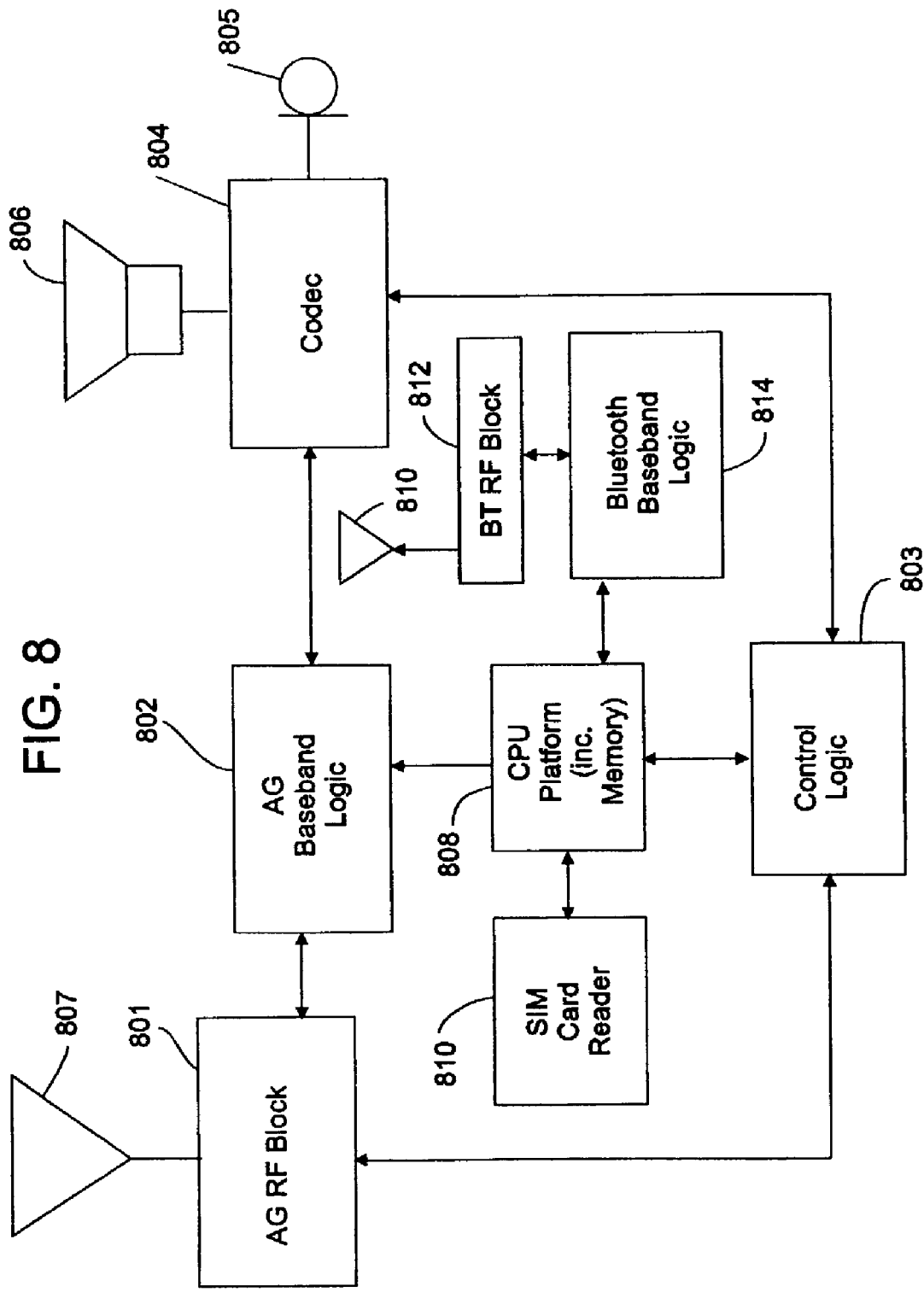

WIRELESS HANDS-FREE SYSTEM WITH SILENT USER SIGNALING

BACKGROUND OF INVENTION

With the wide proliferation of mobile terminals, also called cellular or personal communication system (PCS) terminals, or pervasive computing devices, users have demanded ways to make the use of such devices less obtrusive in public. Consequently, many such devices are today equipped with a "silent alert" function. Such a silent alert function involves the use of a "non-audible" alerting device built into the terminal. This device typically alerts the user to an incoming call, or possibly other events, with vibrations produced by a mechanism such as a piezoelectric vibrator or a motor with an offset mass. Of course, for such an alerting mechanism to be effective the mobile terminal that contains it must be in physical contact with the user when a call is received.

In parallel with the above developments, "Bluetooth" technology has made it practical to connect accessories to a mobile terminal via a short-range wireless interface. Bluetooth is a standard for short-range wireless connections between various types of microprocessor based devices. Bluetooth supports connectivity between computers and peripherals, computers and wireless terminals, and wireless terminals and peripherals, without the use of linking cables. The Bluetooth standard consists of a core specification and supporting documents, including various device profiles that specify signaling required for specific types of devices. The latest core specification is "Specification of the Bluetooth System; Core, version 1.1," and the latest profiles are contained in "Specification of the Bluetooth System; Profiles, version 1.1," both published Feb. 2, 2001 by the Bluetooth special interest group (SIG), Inc., and which are incorporated herein by reference. The Bluetooth SIG is a consortium of companies such as Ericsson, IBM, Intel, Microsoft, Motorola, and others which promulgates Bluetooth standards.

Hands-free headsets have been among the first devices to make use of Bluetooth technology. Such hands-free headsets implement a hands-free Bluetooth profile. Bluetooth connectivity for such headsets means that a headset does not need to be connected via wires to a mobile terminal or other Bluetooth-enabled device. Instead, a user of the headset must simply be within about thirty feet of the terminal device. The Bluetooth standards refer to the terminal device as an "audio gateway". When a terminal in this case wants to alert a user to an incoming call or other event, it plays a ring tone through the ear-piece of the headset. However, if the user does not happen to have the ear-piece inserted or covering his ear at the particular time an alert is received then the user may not be aware of the event, since the terminal could be some distance away and possibly enclosed in a briefcase or switched into a silent alert mode of operation.

SUMMARY OF INVENTION

The present invention provides silent alerting capability for a Bluetooth hands-free device or any hands-free device that relies on a short-range, wireless connection to communicate with a terminal. The silent alerting action can be provided by any non-audible signaling mechanism, for example a vibrator or a light. Any of various detailed signaling scenarios could provide this functionality, either with or without modification of existing short-range wireless signaling mechanisms, including the Bluetooth hands-free profile.

According to some embodiments of the invention, a hands-free device ("HF") establishes a short-range wireless connection with a communication terminal. When an alert message is received over the short-range wireless connection, a silent alerting action is produced in response to an alert message, as opposed to or in addition to an in-band ring tone or other alerting action. In some embodiments, the alert message received by the hands-free device over the short-range wireless connection may specifically designate that the alerting action be silent. (Such a message is referred to hereinafter as a "silent alert message.") This type of alert message may, in some embodiments, result from a user specifically activating a silent mode of operation (hereinafter referred to as "silent alert mode"), either at the communication terminal or at the hands-free device. In this case, subsequent alerts are communicated to the user by means of a non-audible signaling mechanism or mechanisms. In some embodiments, if a user activates silent alert mode at the hands-free device then the hands-free device sends a silent mode activation message back to the communication terminal over the short-range wireless connection instructing the terminal that subsequent alerts should be silent (e.g. the phone should not "ring" upon receiving a call). If the user simply activates silent alert mode at the hands-free device then the hands-free device may or may not mute any in-band ring tone. In some embodiments, the short-range wireless connection is a Bluetooth connection and all messaging exchanged follows a Bluetooth hands-free profile.

In an embodiment where the terminal sends a specific silent alert message to the hands-free, as opposed to sending a normal alerting message that is simply implemented by the HF silently, the terminal must have determined that a user has selected silent alert mode. If a user inputs this information at the terminal, the terminal makes this determination because the user has selected silent alert mode via a normal input device for the terminal. In some embodiments, however, the user can select silent alert mode on the hands-free device, and this selection can be communicated to the terminal via the short-range wireless connection.

In any case, the hands-free apparatus which implements the invention includes a radio frequency (RF) block for the short-range wireless connection, a non-audible signaling mechanism such as a vibrator or light, and normal audio input-output (I/O) devices used for picking up and reproducing voice and other sounds. Baseband logic within the hands-free device in some embodiments controls the hands-free device to receive messages and produce the silent alerting action by applying appropriate voltages to the non-audible signaling mechanism. Software or microcode, or hard-coded semiconductor devices, either of which may make up a portion of the baseband logic, enable the method of the invention to operate within the hands-free device.

In one embodiment, a communication terminal which implements silent alert messages includes: a normal wireless terminal function, herein referred to as the audio gateway (AG) system; a short-range wireless RF block; and short-range baseband logic to control communications over a short-range wireless connection. Such a communication terminal also includes a processing platform operatively connected to the AG system, the short-range baseband logic, RF blocks, and other logic within the communication terminal. Software or microcode within the communication terminal controls the terminal to respond to incoming calls or other events, establish an appropriate short-range wireless connection with the hands-free device, and receive and interpret silent mode activation messages if used. A combination of the above hardware with appropriate internal microcode, software, or hard coded semiconductor logic forms a means to carry out the invention.

BRIEF DESCRIPTION OF DRAWINGS

FIG. 8 is a hardware block diagram of a particular type of communication terminal that can be used to implement some embodiments of the invention.

DETAILED DESCRIPTION

The present invention will now be described with reference to specific example embodiments. It must be understood that these embodiments are examples only and are not meant to limit the scope of the invention. For example, the embodiments described are based on the Bluetooth standards previously discussed. However, the invention could be implemented with hands-free devices and terminals following any short-range wireless communication protocol. Also, the embodiments described are disclosed in terms of a mobile or wireless terminal and a hands-free device. However, a hands-free device could be used with many different types of terminals, including a wired or land-line telephone terminal, a computer system, a PDA, a laptop computer, or any type of "pervasive computing device" through or with which a user may desire to communicate using voice or other audible means. Furthermore, it should be understood that terms such as "silent alert," "non-audible alert" and the like are intended to encompass any alerting mechanism that is primarily intended to alert a user silently relative to a normal ring, notwithstanding that alerting devices, such as a vibrator, may make an incidental sound that can sometimes be heard.

As previously mentioned, the Bluetooth standards refer to a terminal as an "audio gateway", sometimes using the acronym "AG", because a terminal serves as a gateway onto the wide-area or public network. The Bluetooth standards also refer to a headset as a "hands-free" device, often using the acronym "HF". Although this terminology is used in the specific detailed examples described below, it is not meant to suggest that the invention is limited to a Bluetooth implementation. In addition, the specific type of non-audible signaling mechanism used in these examples is a vibrator; however other types are envisioned: for example a blinking light.

Figure 1:
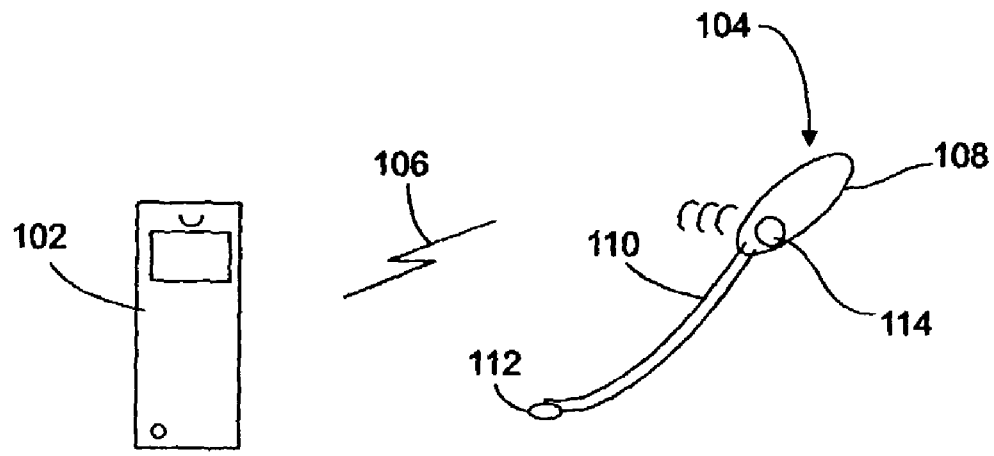
FIG. 1 is an external view of physical hardware implementing one embodiment of the present invention.

FIG. 1 is an external view of hardware implementing some embodiments of the invention. In FIG. 1, communication terminal 102 serves as an AG device. HF device 104 communicates with AG 102 via short-range wireless messages 106. HF 104 includes an ear-piece 1 08 which contains baseband and RF components for the HF device. Boom 110 connects microphone element 112 to ear-piece 108. Connecting wires for the microphone element are embedded within boom 110. In this embodiment, ear-piece 108 includes a vibrator 114. This vibrator is connected to baseband logic within ear-piece 108 and serves as a non-audible signaling mechanism in embodiments represented by the hardware of FIG. 1.

It can be assumed in the case of FIG. 1 that activation of a non-audible signaling mechanism is determined by receipt of a specific silent alert message from AG 102. Alternatively, silent alert mode could be activated when a user removes the headset from his ear. This removal would be detected through a circuit connected to baseband logic within ear-piece 108. Such a circuit might be activated optically, or through some sort of micro switch. Additionally, the vibrator or non-audible alerting mechanism could simply be activated for all alerts. In any case, if the user removes the headset and allows it to dangle on the body, the non-audible alerting mechanism, in this case vibrator 114, would allow the user to be aware of an incoming call or other situation which required an alert (e.g. low battery, Email, short message, etc.).

Figure 2:
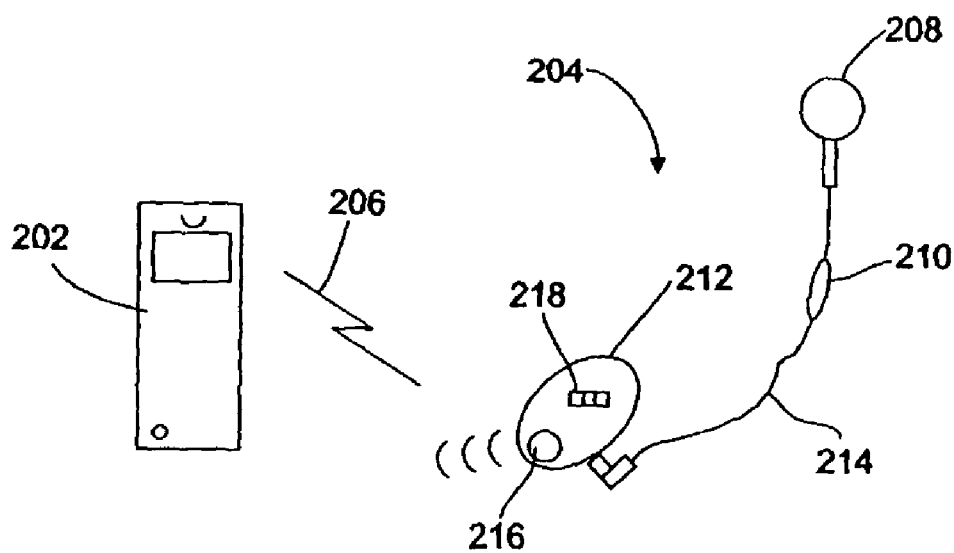
FIG. 2 is an external view of hardware implementing another embodiment of the present invention.

FIG. 2 represents an external view of hardware involved in other embodiments of the invention. In FIG. 2, terminal or AG 202 is in communication with HF device 204. Again, communication is via messages 206 sent over a short-range wireless connection, such as Bluetooth. HF device 204 includes an earpiece 208, a microphone element 210, and an electronics package 212, all interconnected by a cable 214. Electronics package 212 contains baseband and radio frequency (RF) components necessary to communicate with AG 202. This electronics package is embodied as a lapel clip or pin. Non-audible alerting mechanism 216 is included in the electronics package. In this embodiment, if the non-audible alerting mechanism is a vibrator, its vibrations will readily be felt since the electronics package 212 is typically worn on the body whenever the headset is in use, even if the earpiece is temporarily removed. In this particular pictured embodiment, switch 218 is present in the electronics package 212, and enables a user to select a silent alert mode, audible ring tone in the headset only, or both. This switch is connected to baseband logic within the electronics package. In one embodiment, selecting silent alert mode causes a silent mode activation message to be sent to the AG 202 over the short-range wireless connection. In this case, subsequent alert messages sent from AG 202 to HF 204 take the form of a silent alert message. Otherwise, selecting silent alert mode at switch 218 simply causes HF 204 to respond with a silent alerting action to a normal alert message received from AG 202. HF 204 may or may not mute any inband ring tone that would normally be played through ear-piece 208. In effect, switch 218 serves as a silent alert mode input mechanism for HF 204.

Again, the preceding illustrations represent example embodiments of the invention; many other implementations and physical configurations are possible. For example, the lapel pin of the previous example could be replaced by one of a number of other physical embodiments, such as a watch, bracelet, or necklace. Likewise, the cable, connecting the electronics package embodied as a lapel pin in the previous example to the microphone and earpiece, could itself be replaced by yet another short-range wireless link. In such an implementation the silent alert mechanism and the audio functions of the hands-free device might therefore be physically distinct.

Figure 3:
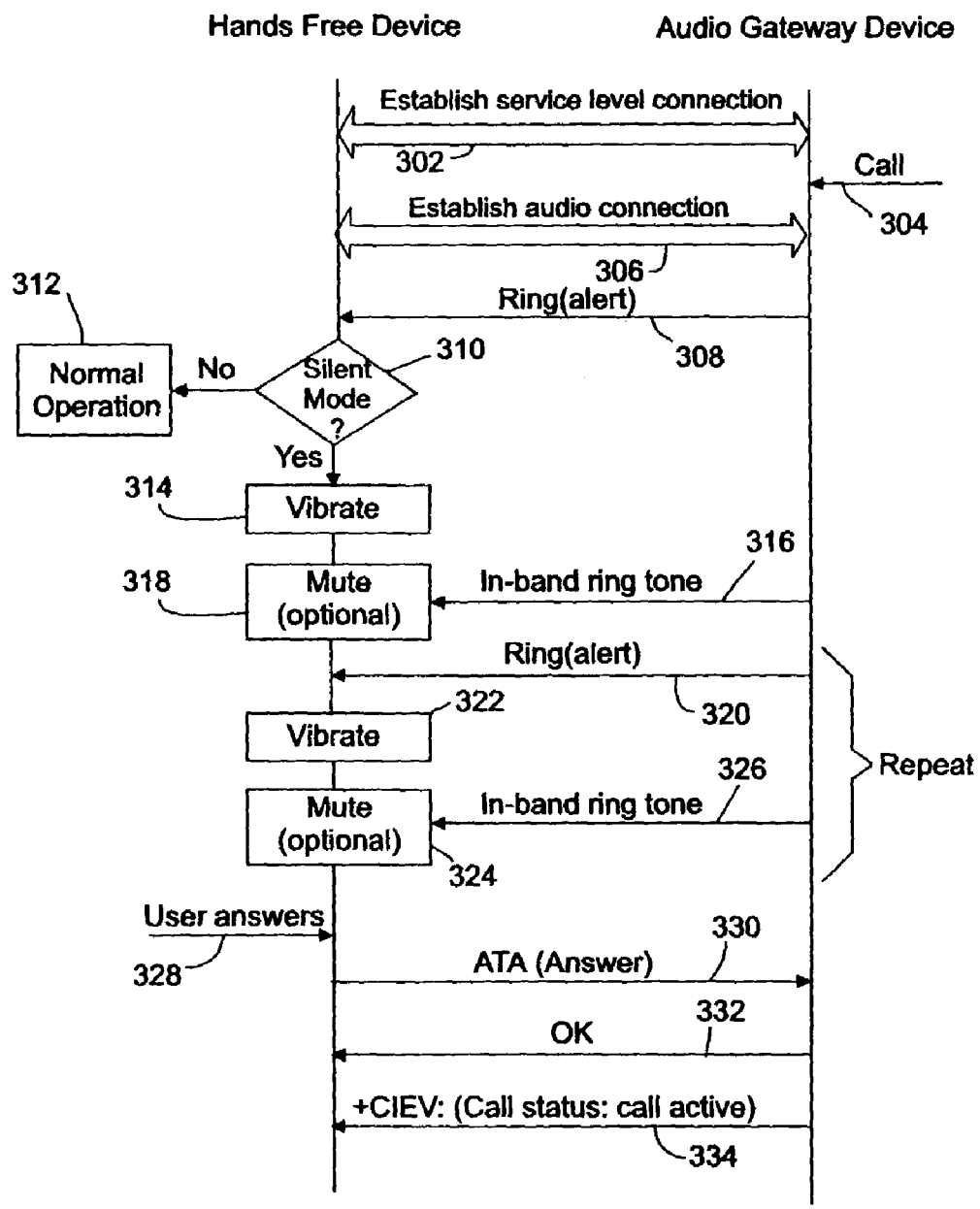
FIG. 3 is a signal flow diagram illustrating the signaling and process which carries out the method of one embodiment of the present invention.

FIG. 3 is a messaging diagram that illustrates how some embodiments of the invention exchange messages between a hands-free device and an audio gateway device. Internal processing within the HF is also illustrated. Pre-existing messages referred to in FIG. 3 and subsequent messaging diagrams are those defined in the Bluetooth hands-free profile. These specific message types are shown as an example only. At step 302, a service level connection is established between the HF and the AG. This connection is established upon either a user action or an internal event, and either the HF or the AG may initiate the connection set up procedure. In the embodiments encompassed by this messaging diagram, once a call is received at step 304 by the audio gateway device then an audio connection is set up at step 306. The purpose of this audio connection is to pass an inband ring tone to the headset. This audio connection is optional, even in the current Bluetooth hands-free profile. It is not needed if an inband ring tone is not to be used, for example if the HF generates its own ring tone. In some embodiments of the invention, it is also not needed, as illustrated in the additional messaging diagrams included herein. If an audio connection is set up at step 306, either the HF or the AG may initiate it. An audio connection is always associated with an existing service level connection. Thus, as a precondition to the audio connection, the service level connection must exist.

In the embodiment of FIG. 3, once the audio connection is established, a ring (alert) message is sent from the AG to the HF at step 308. At this point, the HF determines whether silent alert mode has been selected at step 310. If not, the HF alerts the user in the prior art fashion through processes initiated at 312. If silent alert mode is selected, or if silent mode alerting is simply always present in the device, then a silent alerting action is executed at step 314. In this embodiment, a silent alerting action is performed by activating a vibrator. Since the embodiments of FIG. 3 assume that a preexisting Bluetooth hands-free profile with in-band ring tone is being used, an inband ring tone is sent from the audio gateway device to the HF at step 316. The HF can optionally mute this tone at step 318. If the user does not answer immediately, another ring (alert) message is sent from the AG to the HF at step 320. Again, the vibrator is activated at step 322. If the inband ring tone is muted, the muting action is again activated at step 324 when the inband ring tone is sent over the audio connection at step 326. These last four steps will be repeated as necessary. Any optional pattern or pulsing of the vibrating element can be implemented in these embodiments by the baseband logic applying appropriate on/off signaling to the vibrator. Similar patterns of pulsing can be applied to other non-audible signaling mechanisms.

In the example of FIG. 3, a user answers at 328. This answer initiates an "attention" command, or "AT" command, from the HF device to the AG device. In this case, the message contains an "ATA" message, or answer message, as shown at 330. The AG device issues a standard "ok" response at 332. The AG device then issues the command "+CIEV", which in the Bluetooth HF profile is an unsolicited call status indication message. This message can specify specific parameters about the call status. In this case, message 334 specifies that the call status is active.

Figure 4:
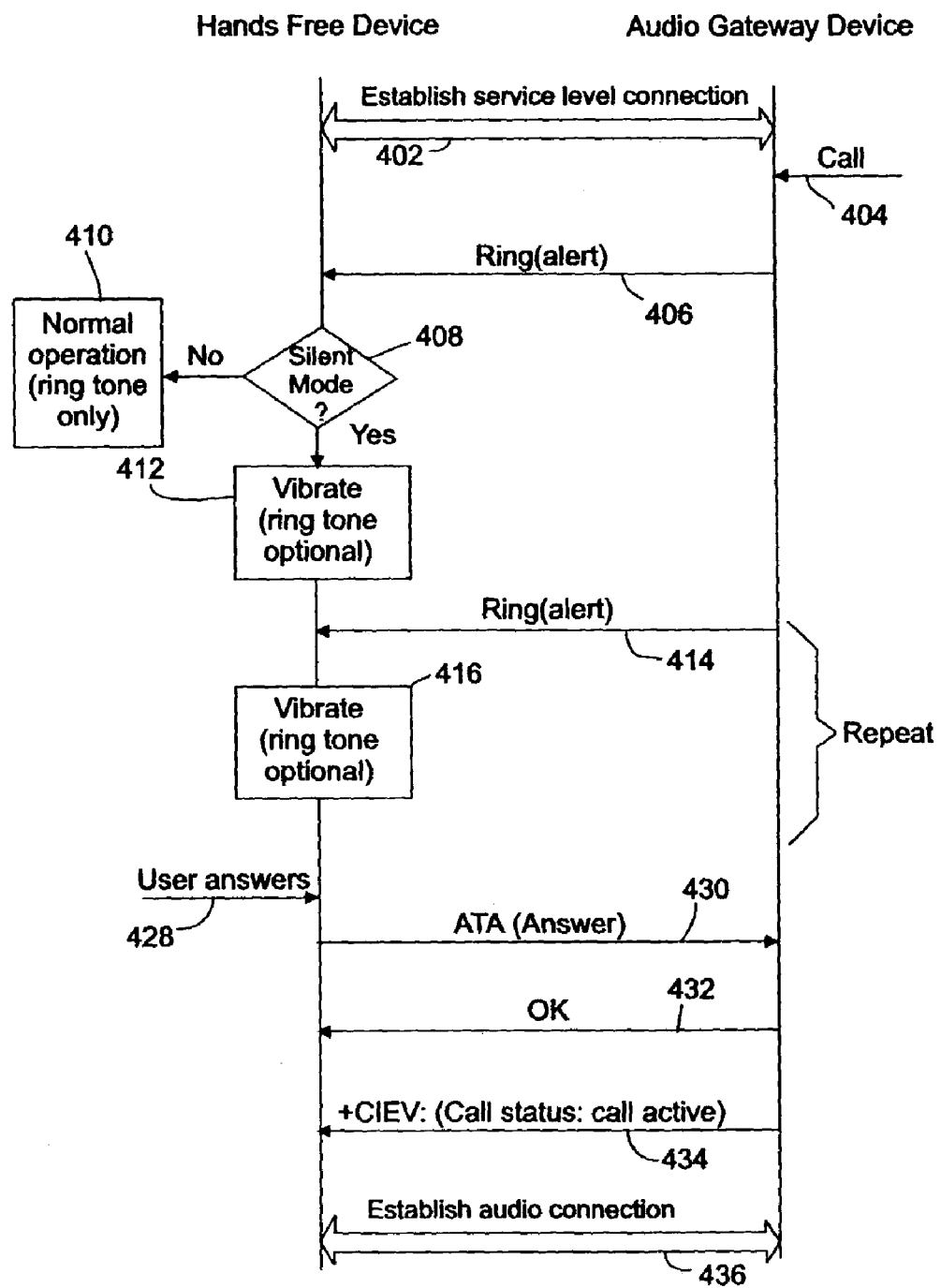
FIG. 4 is another signal and process flow diagram which illustrates how another embodiment of the invention is carried out.

FIG. 4 is another messaging diagram illustrating some of the internal processing of the HF device. The scenario of FIG. 4 again assumes that a standard Bluetooth hands-free profile is being used. In this case, no in-band ring tone is sent by the AG device, as it is known that the particular model headset generates its own ring tone. Again, a service level connection is set up at step 402. A call is received at step 404. A ring (alert) message is sent from the AG device to the HF device at step 406. The HF device determines at step 408 whether silent alert mode is in effect. If not, normal operation, including generation of a ring tone in the ear-piece, is initiated at 410. If silent alert mode is in effect, a silent alerting action, in this case a vibration, is generated at 412. Optionally, the ring tone may also be generated. Silent alert mode selection and the optional ring tone generation are input by the user through controls on the HF device. If the user does not respond to the alert, the ring (alert) message is again sent at step 414 and the vibration is again generated at step 416. These steps repeat as necessary until the user responds. The rest of the scenario is similar to that shown in FIG. 3. A user answers at 428, and an "ATA" message is sent from the HF device to the AG device at 430. An "ok" response message is sent from the AG device to the HF device at 432. Again, the unsolicited call status indication message 434 is sent from the AG device to the HF device. In this case, however, the audio connection is not established until 436, at which time the user may begin a conversation with the caller. Step 436, establishment of the audio connection, may not take place if the alert is for some other reason besides an incoming call. For example, an alert might indicate a received Email, short message, or some change in the status of either the HF device or the AG device, such as a low battery situation.

Figure 5:
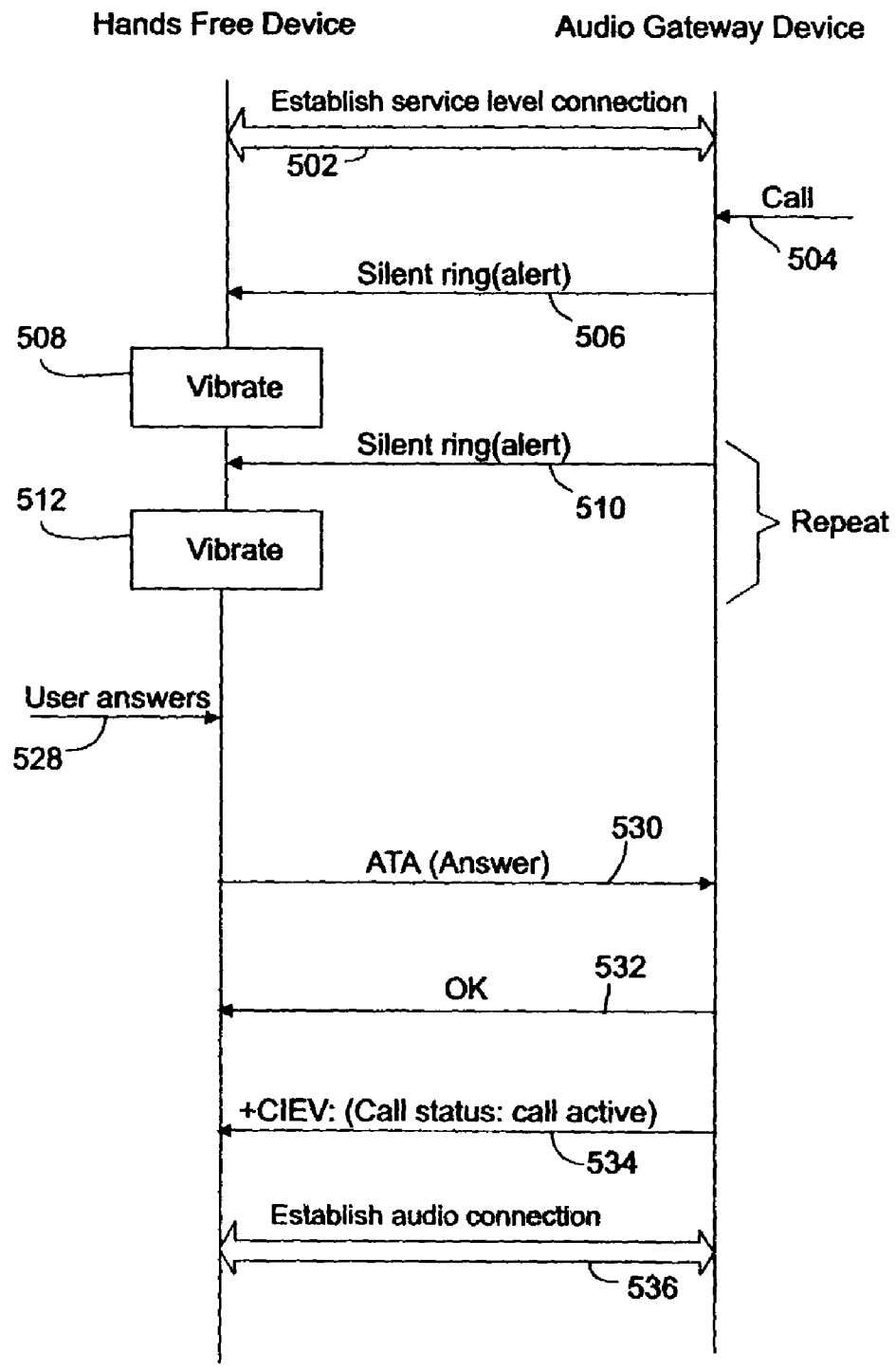
FIG. 5 is another signal and process flow diagram which illustrates the process of an embodiment of the invention.
Figure 6:
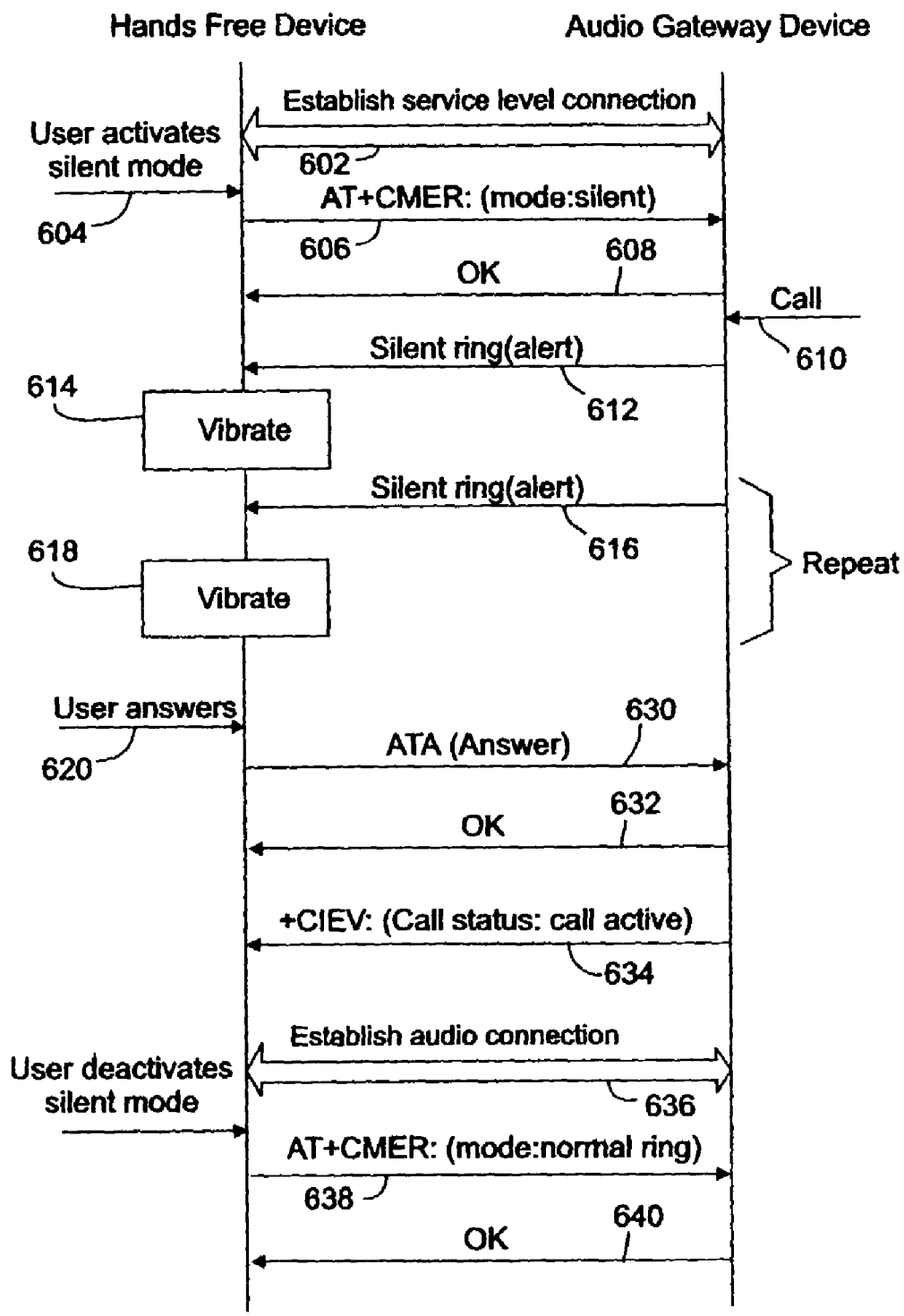
FIG. 6 is another signal and process flow diagram which illustrates the method behind an embodiment of the invention.

FIGS. 5 and 6 both illustrate scenarios for embodiments where the Bluetooth hands-free profile has been modified to include messages particularly related to a silent mode of operation for hands-free devices. (Again it should be noted that Bluetooth is not essential to this invention; any short-range wireless communications link may be used.) In FIG. 5, a service level connection is again established at 502. A call is received at 505. In this scenario, a silent alert message is sent from the AG device to the HF device at step 506. This message is similar to the normal ring message previously discussed, however this message explicitly specifies a silent ring. The AG device is programmed and designed to send this new message according to these embodiments of the invention. In addition, the HF device is programmed and designed to understand this new message according to these embodiments of the invention. In response to this message, the HF device produces a silent alerting action at 508. In this example, the action is a vibration. If a user does not answer, the silent ring (alert) message is repeated at 510 and the silent alerting action is repeated at 512. These two steps repeat as necessary.

As before, when a user answers at step 528 an ATA (answer) message 530 is sent from the HF device to the AG device. An "ok" response message is transferred in the other direction at step 532. Again, an unsolicited call status indication message is sent from the AG device to the HF device at step 534. Finally, the audio connection is established at step 536.

In the above scenario, the AG device must know to send a silent alert message to the HF device. It is assumed that it has been set to do so through a user input process. FIG. 6 illustrates an example embodiment where user input selection of silent alert mode is carried out at the hands-free device. In FIG. 6, a service level connection is again established at 602. In this case, however, a user activates silent alert mode by using a silent alert mode input mechanism, such as a switch, on the HF device. The user takes this action at step 604. This input causes the HF to send the AG a message. The message illustrated in this embodiment is a standard event reporting message, "AT+CMER". This message is currently defined in the Bluetooth hands-free profile. According to this embodiment of the invention, however, new parameters designating a silent alert mode are added to this message. Thus, message 606 in FIG. 6 is an "AT+CMER:(mode: silent)" message sent from the HF device to the AG device. The AG device responds with an "ok" message at step 608. A call is received at step 610 and the AG device responds by forwarding a silent alert message to the HF device at 612. The silent alerting action is initiated at the HF device at step 614. If the user does not answer a silent alert message 616 is again sent to the HF device. Again, a silent alerting action, in this case a vibration, is generated at 618, and these steps are repeated until the user answers. When the user answers at 620, an "ATA (answer)" message 630 is again sent from the HF device to the AG device and an "ok" response 632 results. An unsolicited call status indication message 634 is again sent from the AG device to the HF device as before. Then an audio connection is established at step 636 as before.

In the example of FIG. 6, it is assumed that a user decides that he or she would like to hear a normal audible alert for subsequent events. Thus a standard event reporting command, "AT+CMER", is again sent from the HF device to the AG device in response to user input at the HF device. In this case, the new defined parameter is for a normal ring. Thus the message "AT+CMER:(mode: normal ring)" is forwarded from the HF device to the AG device at step 638. The audio gateway device again responds with an "ok" at step 640.

Figure 7:
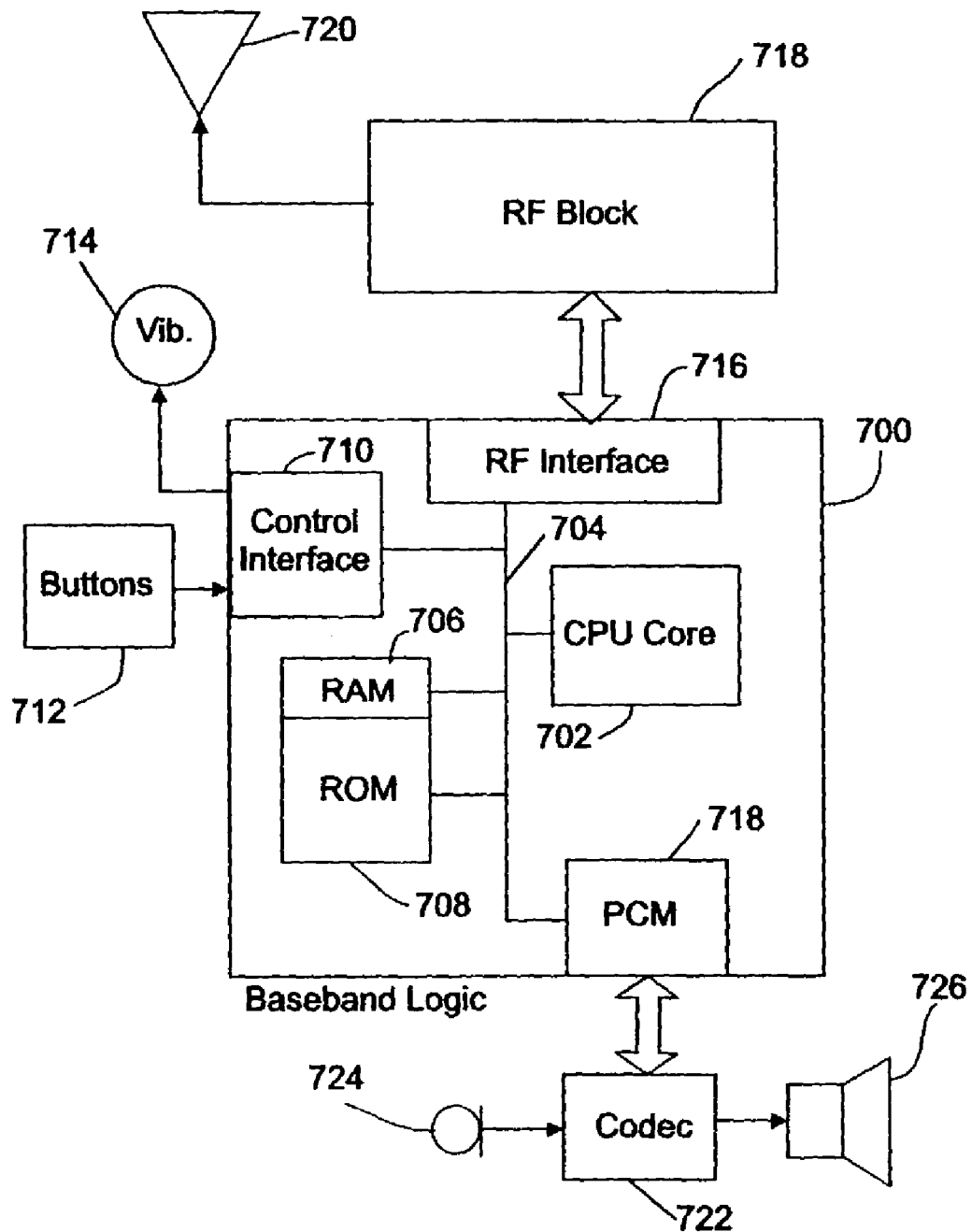
FIG. 7 is a hardware block diagram of a hands-free device that can be used to implement some embodiments of the invention.

FIG. 7 is a hardware block diagram of a hands-free device that can implement embodiments of the present invention. Due to the compactness of hands-free devices of this type, much of the function of such a device is often contained within a single semiconductor chip that implements the baseband logic 700 of the device. In fact, all of the electronics and/or logic of the hands-free device, including RF elements, can be integrated in a single component. In the example of FIG. 7, baseband logic includes a central processing unit (CPU) core 702. This processing core controls the operation of the device. Typically this core will include a microprocessor and supporting logic to implement a protocol stack for the short-range wireless interface and link control functions. An internal bus 704 links the CPU core to various other elements within the baseband logic. These include memory, which may be organized into random access memory (RAM) 706 and read only memory (ROM) 708. The RAM is used to temporarily store information being sent and received over the short-range wireless connection. The ROM stores computer program code or microcode which controls the operation of the device. Control interface 710 receives input from any buttons or controls 712 that may be included in the hands-free device. These buttons or controls typically correspond to any silent alert mode input mechanism that may be present. Control interface 710 will also send voltage signals to a non-audible signaling mechanism, in this case vibrator 714. It should be noted that the non-audible signaling mechanism could also be of another type, for example a flashing light. Also, the type of vibrator used would be a design choice. Examples of vibrators include piezoelectric devices and a small electric motor with an offset mass.

RF interface 716 and pulse coded modulation (PCM) block 718 in this example each provide interfaces to devices which may be external to baseband logic 700. RF interface 716 provides connectivity to RF block 718 which provides the radio frequency transmit and receive function for the short-range wireless connection through antenna 720, which may be an internal antenna. PCM interface 718 provides connectivity to codec 722. The codec encodes audio received through microphone 724 and decodes audio to be played through speaker 726. Depending on the particular configuration of hands-free device, speaker 726 and microphone 724 may be located remotely from the actual codec and other hardware within the hands-free device. For example, with a boom headset the microphone is located at the end of a boom and connected by wires to the codec. In a device implemented as a lapel pin, both the microphone and speaker are located remotely and connected by wires to the codec. It should be emphasized that the hardware block diagram illustrated in FIG. 7 is an example only. Numerous configurations of logic exist to implement such devices, including Bluetooth devices.

FIG. 8 is a block diagram of a mobile terminal that implements embodiments of the invention. FIG. 8 illustrates a mobile terminal with Bluetooth capability. Again, it must be understood that the present invention could be implemented with any short-range wireless technology and is not necessarily limited to implementations of the Bluetooth standard. This illustration is for example purposes only, and even with Bluetooth terminals of substantially different configurations the invention will work as previously described. Also, as previously mentioned, a Bluetooth hands-free device could be used with other audio gateway devices besides mobile terminals, including, for example, personal computers, wired terminals, work stations, or any other type of device that can be used to send and receive audio messaging. The terminal of FIG. 8 includes traditional mobile terminal elements which work together to implement communications functions with a public, wide-area, wireless network. It can be said that these elements work together to form an audio gateway (AG) system. These include an AG RF block 801, an AG baseband logic block 802, a control logic block 803, and a local audio codec 804 for interface with microphone and speaker elements. Within radio block 801, receive and transmit information for a public network is converted from and to appropriate radio frequencies, and filtering using baseband or intermediate frequency circuitry is applied, as is understood in the art. The terminal's long-range antenna system 807 is connected to AG RF block 801. In AG baseband logic block 802, basic signal processing occurs, including, for example, synchronization, channel coding, decoding, and burst formatting, as is understood in the art. Codec 804 handles voice and analog-to-digital and digital-to-analog processing to receive input through microphone 805 and produce output through speaker 806. Functions of the aforementioned AG transceiving blocks are directed and controlled by one or more microprocessors or digital signal processors and associated memory containing appropriate microcode shown as central processing unit (CPU) platform 808 for illustrative purposes. The terminal of this example accepts a subscriber identity module (SIM) card at a SIM card reader interface 810. Control logic 803 controls human interface components such as a keypad and a liquid crystal display (LCD), which are not shown for clarity. The aforementioned elements form the AG system of the mobile terminal.

The mobile terminal of FIG. 8 includes a Bluetooth antenna element 810, (possibly internal) and a Bluetooth RF block, 812. These elements are essentially the same as those found in the hands-free device. The terminal also includes Bluetooth baseband logic 814. The Bluetooth baseband logic is functionally connected to the CPU platform of the mobile terminal. The Bluetooth baseband logic is essentially the same as that shown in FIG. 7 for the hands-free device, with the exception of the control interface. In place of the control interface would be an interface as necessary to connect to the CPU platform and possibly other elements within the mobile terminal. These might include one or more of a universal serial bus (USB) interface, a universal asynchronous receiver transmitter (UART), and clock and data read/write lines. It should be noted, however, that Bluetooth antenna 810, Bluetooth RF block 812, and Bluetooth baseband logic block 814, may each be physically combined with corresponding sections of the AG assembly, and need not be physically distinct. For example, a single antenna structure, capable of radiating at multiple frequencies and thus operating simultaneously as AG antenna 807 and Bluetooth antenna 810 is possible. Similarly, the functionality of the Bluetooth baseband logic block 814 may be incorporated into a device embodying the AG baseband logic 802 and may thus be physically indistinguishable. Accordingly, references to any of these functions or functional elements herein are meant to refer to the function either as incorporated into distinct components or as combined with other functions in any components in a terminal.

While the mobile terminal described above is similar to a traditional "cellular" telephone, as used herein the terms mobile terminal, wireless terminal, or audio gateway device and similar terms may refer to: a cellular telephone either with or without a multi-line display; a personal communication system (PCS) terminal that may combine a cellular radio telephone with data processing, facsimile and data communications capabilities; a personal data assistant (PDA) that can include a radio telephone, pager, internet access, web browser, organizer; or a pervasive computing device. Again, an audio gateway terminal that implements features of the invention could be a conventional personal computer, whether a desktop or laptop, or any other appliance or electronic device that might exchange voice information with a wired or wireless network. Indeed, the terminal could be a terminal without a network connection, in which a hands-free device could simply be used for speech recognition and playback. A wireless hands-free device operating on a short-range wireless connection with a terminal could be used for dictation and playback, entertainment, or other applications.

Specific embodiments of an invention have been described herein. One of ordinary skill in the telecommunication and electronics arts will recognize that the invention has other applications in other environments. In fact, many embodiments and implementations are possible. The following claims are in no way intended to limit the scope of the invention to the specific embodiments described herein.

We claim:

1. A method of signaling a user of a hands-free device for a communication terminal, the method comprising:
   establishing a short-range, wireless connection between the hands-free device and the communication terminal;
   receiving an alert message over the short-range, wireless connection indicating an incoming call;
   determining whether the user has, at the hands-free device, placed the hands-free device into silent alert mode;
   producing a silent alerting action when the hands-free device receives the alert message in response to determining that the hands-free device was selected to be in silent alert mode; and
   producing of a ring tone at the hands-free device when the hands-free device receives the alert message in response to determining that the hands-free device was not selected to be in silent alert mode.

2. The method of claim 1 wherein the alert message specifically designates the silent alerting action.

3. The method of claim 1 further comprising sending a silent mode activation message to the communication terminal over the short-range, wireless connection.

4. The method of claim 1 further comprising muting an in-band ring tone at the hands-free device.

5. The method of claim 1 wherein the short-range wireless connection is a Bluetooth connection and the alert message is based on a Bluetooth hands-free profile.

6. A method of signaling a user of an incoming call comprising:
   establishing a short-range wireless connection with between a hands-free device and a communications terminal;
   receiving an incoming call over a network connection;
   determining that the user has, at the hands-free device, selected silent alert mode by receiving a message from the hands-free device designating the hands-free to be in silent alert mode;
   sending a silent alert message to the hands-free device over the short-range wireless connection in response to determining that the user has selected silent alert mode, the silent alert message explicitly instructing the hands-free device to produce a silent alerting action; and
   sending a ring alert message to the hands-free device over the short-range wireless connection in response to determining that the user has not selected silent alert mode.

7. The method of claim 6 wherein the determining that the user has selected silent alert mode further comprises receiving a silent mode activation message from the hands-free device.

8. The method of claim 7 wherein the short-range wireless connection is a Bluetooth connection and the silent alert message and silent mode activation message are based on a Bluetooth hands-free profile.

9. The method of claim 6 wherein the short-range wireless connection is a Bluetooth connection and the silent alert message is based on a Bluetooth hands-free profile.

10. Apparatus for signaling a user of a hands-free device for a communication terminal, the apparatus comprising:
    means for establishing a short-range, wireless connection between the hands-free device and the communication terminal;
    means for receiving at the hands-free device an alert message over the short-range, wireless connection; and
    means for determining whether the user has, at the hands-free device, placed the hands-free device into silent alert mode;
    means for producing a silent alerting action when the hands-free device receives the alert message in response to determining that the hands-free device was selected to be in silent alert mode; and
    means for producing of a ring tone at the hands-free device when the hands-free device receives the alert message in response to determining that the hands-free device was not selected to be in silent alert mode.

11. The apparatus of claim 10 wherein the means for determining whether the user has, at the hands-free device, placed the hands-free device into silent alert mode comprises means for detecting user selection of a silent alert mode at the hands-free device.

12. The apparatus of claim 11 further comprising means for sending a silent mode activation message to the communication terminal over the short-range, wireless connection.

13. The apparatus of claim 11 further comprising means for muting an in-band ring tone at the hands-free device.

14. Apparatus for signaling a user of an incoming call, the apparatus comprising:
    means for establishing a short-range wireless connection with a hands-free device;
    means for receiving an incoming call over a network connection;
    means for determining that the user has, at the hands-free device, selected silent alert mode by receiving a message from the hands-free device designating the hands-free to be in silent alert mode;
    means for sending a silent alert message to the hands-free device over the short-range wireless connection in response to determining that the user has selected silent alert mode, the silent alert message explicitly instructing the hands-free device to produce a silent alerting action; and means for sending a ring alert message to the hands-free device over the short-range wireless connection in response to determining that the user has not selected silent alert mode.

15. The apparatus of claim 14 further comprising means for receiving a silent mode activation message from the hands-free device.

16. A hands-free apparatus for a communication terminal, the hands-free apparatus comprising:
a non-audible signaling mechanism;
a silent alert mode input mechanism connected to the logic, the silent alert mode input mechanism operable for enabling a user to activate a silent alert mode of operation; audio input/output devices; and
logic operatively connected to the non-audible signaling mechanism and the audio input/output devices, the logic operable to control the hands-free device by being configured for:
receiving an alert message over the short-range, wireless connection indicating an incoming call;
determining whether the user has, at the hands-free device, placed the hands-free device into silent alert mode;
producing a silent alerting action when the hands-free device receives the alert message in response to determining that the hands-free device was selected to be in silent alert mode of operation; and
producing of a ring tone at the hands-free device when the hands-free device receives the alert message in response to determining that the hands-free device was not selected to be in silent alert mode of operation.

17. The hands-free apparatus of claim 16 wherein activation of the silent mode of operation causes the sending of a silent mode activation message to the communication terminal through the short-range wireless connection.

18. The hands-free device of claim 17 wherein the short-range wireless connection is a Bluetooth connection and the alert message and the silent mode activation message are based on a Bluetooth hands-free profile.

19. The hands-free device of claim 16 wherein the non-audible signaling mechanism comprises a vibrator.

20. The hands-free device of claim 16 wherein the non-audible signaling mechanism comprises a light.

21. The hands-free device of claim 16 wherein the short-range wireless connection is a Bluetooth connection and the alert message is based on a Bluetooth hands-free profile.

22. A communication terminal comprising:
an audio gateway (AG) system;
a short-range radio frequency (RF) block receiving an incoming call over a network connection;
short-range baseband logic; and
a processing platform operatively connected to the AG system, the short-range baseband logic and the short-range RF block, the processing platform operable to control the communication terminal by being configured for:

establishing a short-range wireless connection with a hands-free device;
determining that the user has, at the hands-free device, selected silent alert mode by receiving a message from the hands-free device designating the hands-free to be in silent alert mode;
sending a silent alert message to the hands-free device over the short-range wireless connection in response to determining that the user has selected silent alert mode, the silent alert message explicitly instructing the hands-free device to produce a silent alerting action; and
sending a ring alert message to the hands-free device over the short-range wireless connection in response to determining that the user has not selected silent alert mode.

23. The communication terminal of claim 22 wherein the processing platform is further operable to control the communication terminal to receive a silent mode activation message from the hands-free device over the short-range RF block.

24. The communication terminal of claim 23 wherein the short-range wireless connection is a Bluetooth connection and the silent alert message and silent mode activation message are based on a Bluetooth hands-free profile.

25. The communication terminal of claim 22 wherein the short-range wireless connection is a Bluetooth connection and the silent alert message is based on a Bluetooth hands-free profile.

26. A method of signaling a user of a hands-free device for a communication terminal, the method comprising:
establishing a short-range, wireless, two-way connection between the hands-free device and the communication terminal;
detecting user selection of a silent alert mode at the hands-free device;
receiving, at the hands-free device, a silent alert message over the short-range, wireless, two-way connection, wherein the silent alert message explicitly specifies the hands-free device to produce a silent ring such that when the hands-free device receives the silent alert message the hands-free device is programmed and designed to produce a silent alert instead of an audible ring alert; and
producing a silent alerting action in response to the hands-free device receiving the silent alert message.

27. The method of claim 26, wherein the silent alert message comprises a base message plus added parameters to designating the hands-free device to be placed into silent alert mode.

28. The method of claim 27, wherein the base message comprises "AT+CMER" and the added parameters comprises "(mode: silent)" so that the silent alert message comprises "AT+CMER: (mode: silent)".

29. The method of claim 27, further comprising sending a silent mode activation message to the communication terminal over the short-range, wireless connection such that when the communication terminal receives the silent mode activation message, the communication terminal sends subsequent silent alert messages to the hands-free device when receiving calls.

* * * * *